United States Patent [19]

Harmon

[11] Patent Number: 4,610,457

[45] Date of Patent: Sep. 9, 1986

[54] VEHICLE SWIVEL HITCH

[76] Inventor: Thomas M. Harmon, 12712 N.E. Hollyhills Dr., Bothell, Wash. 98011

[21] Appl. No.: 709,052

[22] Filed: Mar. 6, 1985

[51] Int. Cl.<sup>4</sup> ............................................. B60D 1/06
[52] U.S. Cl. .................................. 280/204; 280/492; 280/511
[58] Field of Search ............... 280/204, 292, 492, 493, 280/494, 511

[56] References Cited

U.S. PATENT DOCUMENTS

| 2,221,278 | 11/1940 | Utterback | 280/492 |
| 2,343,019 | 2/1944 | Neal | 280/204 X |
| 4,230,336 | 10/1980 | Avrea et al. | 280/511 |

FOREIGN PATENT DOCUMENTS

| 2282348 | 3/1976 | France | 280/492 |
| 15287 | of 1901 | United Kingdom | 280/204 |

Primary Examiner—John A. Pekar
Attorney, Agent, or Firm—Richard C. Litman

[57] ABSTRACT

A hitch for connecting a trailer to a vehicle, especially a motorcycle or land-roving vehicle. The hitch comprises two couplings, including a conventional ball member adjacent one end, and a ball-bearing assembly located intermediate the ball member and the means for attaching the hitch to the vehicle. The ball-bearing assembly is capable of rotational movement about a horizontal axis for a full 360 degrees. The hitch thus provides unlimited rotational movement between the vehicle and the trailer in addition to the conventional pivotal movement provided by the ball member coupling.

5 Claims, 3 Drawing Figures

VEHICLE SWIVEL HITCH

BACKGROUND OF THE INVENTION

The present invention is for a trailer hitch suitable for attachment to a two-wheeled vehicle, such as a motorcycle, and enables the vehicle to tow conventional trailers having either two or four wheels.

Numerous hitches have been devised with which a two-wheeled vehicle can tow a trailer. Many of these hitches were merely conventional automobile hitches having attaching means specifically designed for connecting to a motorcycle. Another group of hitches had universal coupling means which did permit pivotal movement about both a vertical axis and a horizontal axis. These hitches, however, had no provision to handle any of the appreciable "leaning" movement of a motorcycle when turning corners for instance.

Other hitches, while providing a rotational coupling, such as shown in U.S. Pat. No. 3,848,890, lack the means needed to handle the load and forces created in using a motorcycle to pull a large size trailer.

The present invention overcomes the mechanical limitations in existing hitching devices for motorcycles and provides a device capable of handling any leaning or cornering movement of the motorcycle, while at the same time being fully capable of handling all forces created in pulling a large load.

Another object of the present invention is to provide a strong, rugged and safe hitch which will also handle any rotational motion between the vehicle and the trailer. This hitch is therefore also highly desirable for a land-roving vehicle when engaged in cross-country trailering.

SUMMARY OF THE INVENTION

The present invention is for a trailer hitch especially suitable for two-wheeled vehicles, such as a motorcycle, and for land-roving vehicles and comprises a ball member connected to an intermediate ball-bearing assembly. The ball-bearing assembly has means to permit it to swivel freely through an arc of 360 degrees about its central axis. This swivelling feature of the ball-bearing assembly enables the conventional ball member to remain in a vertical position regardless of the attitude of the vehicle. The ball-bearing assembly allows the trailer to be rigidly mounted and yet to be able to rotate about its axis as required by the "lean angle" of the motorcycle during cornering or maneuvering.

BRIEF DESCRIPTION OF THE DRAWINGS

The features and objects of the invention will be better understood by referring to the accompanying drawing in which.

DESCRIPTION OF THE PREFERRED EMBODIMENT

Figure 1:
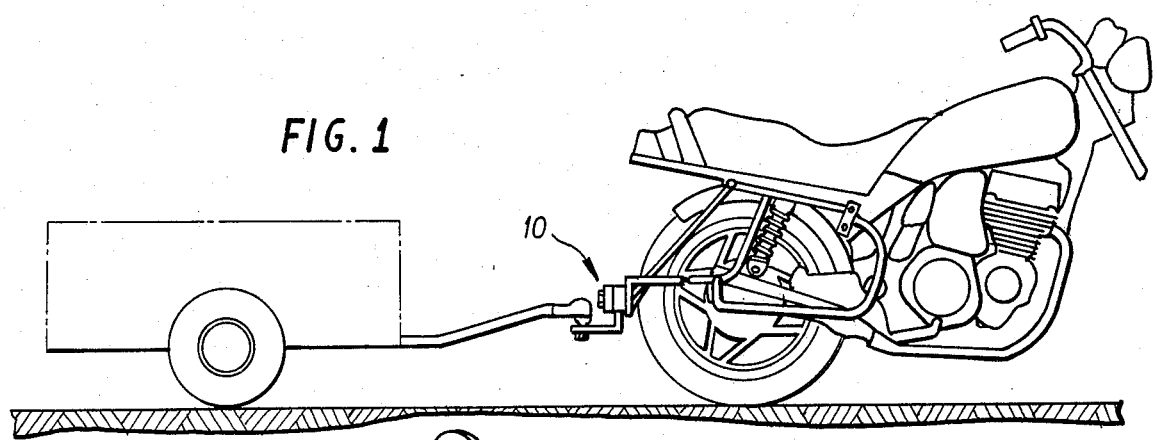
FIG. 1 is a side view of a motorcycle to which is attached a trailer by means of a hitch of the present invention.

FIG. 1 illustrates a typical arrangement of a motorcycle pulling a trailer by means of the trailer hitch 10 of the present invention.

Figure 2:
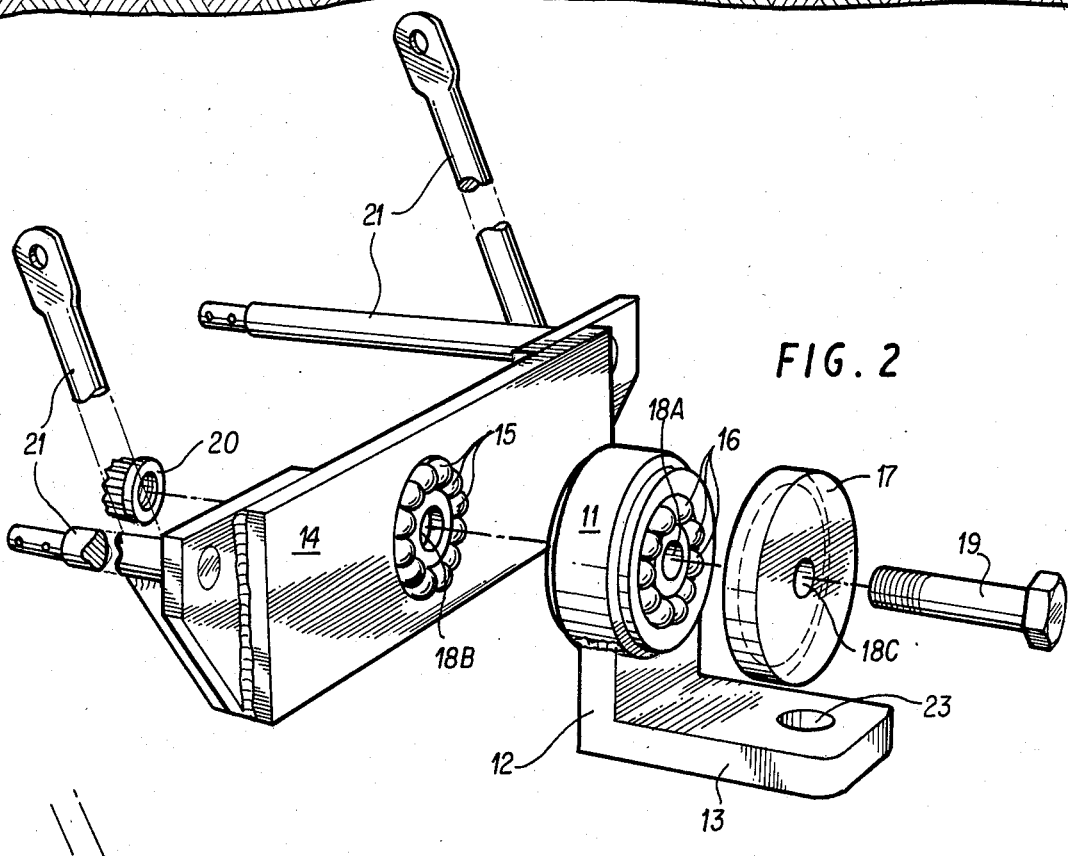
FIG. 2 is an exploded isometric view of the trailer hitch showing the construction of the ball-bearing assembly.

FIG. 2 further illustrates the invention wherein the ball-bearing assembly comprises a first metal plate 11 having a vertically depending segment 12 which is integral therewith. In the present embodiment, the segment 12 is thinner than the plate 11, is attached thereto by a weld, and is centrally positioned along the thickness of the lower portion of the plate 11. The segment 12 terminates in a horizontal segment 13. The first metal plate 11 is maintained in a spaced relationship with a second metal plate 14 of the ball-bearing assembly by means of a first plurality of ball bearings 15 interposed therebetween. The assembly further comprises a second plurality of ball bearings 16 and a cover plate 17. The first plate 11, the second plate 14, and the cover plate 17 are each fabricated with a centered opening 18A, 18B, and 18C, through which is inserted a metal bolt 19. The bolt is threadably engaged with a locking nut 20. Metal bolt 19 and locking nut 20 form a tightening means whereby plates 11 and 17 are held against the ball-bearings 16, and plates 11 and 14 are held against the ball-bearings 15.

The structural connection of the hitch to a motorcycle is accomplished by means of a plurality of rods 21 which are adapted to engage any convenient mounting arrangement of the mtorocycle. The structural connection of the hitch of the present invention to a land-roving vehicle (not shown) is accomplished by any conventional means suitable for an automobile.

Figure 3:
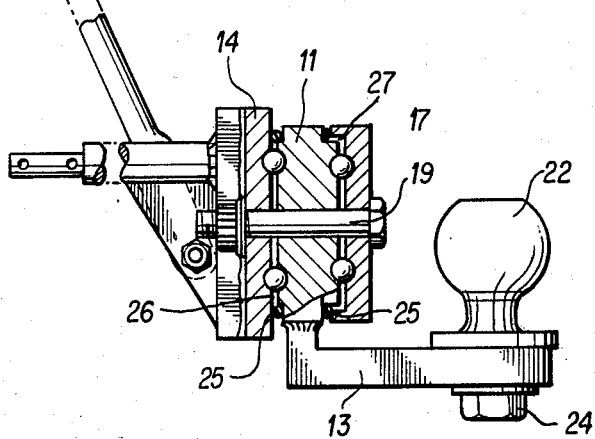
FIG. 3 is a side view and partial cross section of the hitch.

FIG. 3 shows the assembled trailer hitch complete with the conventional trailer ball 22. The ball is secured to the horizontal segment 13 by means of a bolt 24 which extends through an opening 23. Also shown in FIG. 3 is the spaced relationship of the plates 11, 14, and 17 of the ball-bearing assembly. The ball bearings are sealed by means of O-rings 25 which are positioned on protruding shoulder portions 26 and 27 of the plate 11.

It will be noted that the first plate 11 is therefore free to rotate about the axis of the bolt 19. The result is that segment 13 will remain in a horizontal position while the rest of the assembly, which is attached to the vehicle, can rotate about the horizontal axis of the bearing. Torsional or rotational forces are thereby prevented from being transmitted between the vehicle and the trailer without any torsional or binding forces which could cause the vehicle and the trailer to tip over or jackknife.

I claim:

1. A trailer hitch having a ball-bearing assembly made up of plates, said plates held against balls between said plates by a tightening means, said plates having an axis of rotation around said tightening means wherein the improvement comprises in combination, a first vertical plate of said assembly, vehicle attaching means connected to said first plate, a second vertical plate of said ball-bearing assembly having a member extending in a direction away from said attaching means, said member having a trailer connecting element attached thereto, said trailer connecting element extending from said member in a direction toward the axis of rotation so as to be in line with the axis of rotation, a set of balls located between said two plates, and tightening means securing said two plates against said set of balls and controlling the constraint of rotation, whereby rotational movement in a vertical plane is permitted between a towing vehicle and a trailer attached thereto.

2. A trailer hitch according to claim 1, wherein said assembly includes a third plate located on the face of said second plate opposite to said first plate and a second set of ball-bearings located between said second and third plates.

3. A trailer hitch according to claim 1, wherein said securing means comprises a bolt extending through each of said plates, said bolt determining the axis of said rotational movement.

4. A trailer hitch according to claim 3, wherein said assembly includes a third plate located on the face of said second plate opposite to said first plate and a second set of ball-bearings located between said second and third plates, said bolt also extending through said third plate.

5. The trailer hitch of claim 1 wherein said vehicle is a motorcycle.

* * * * *